United States Patent Office 3,085,446
Patented Apr. 16, 1963

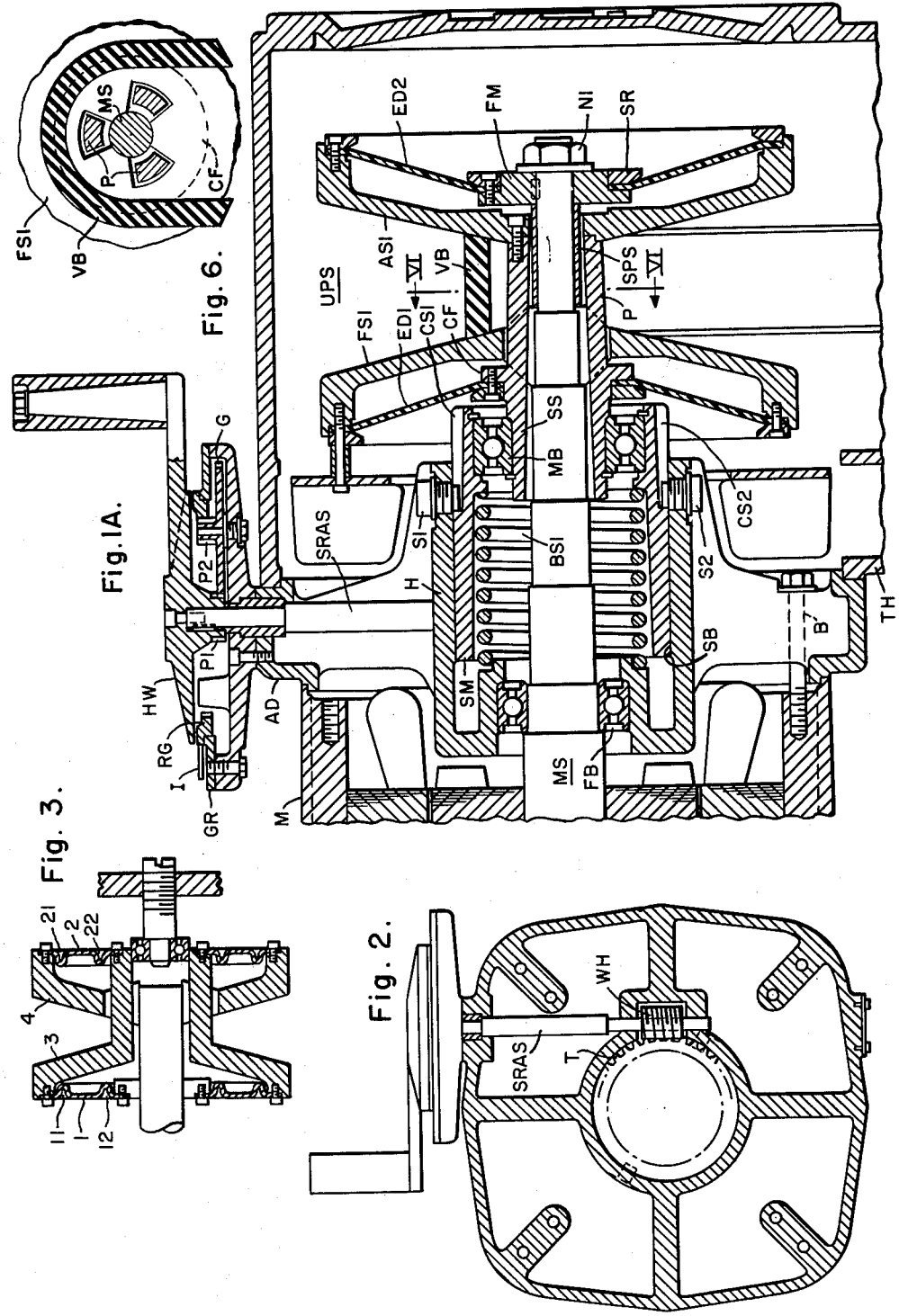

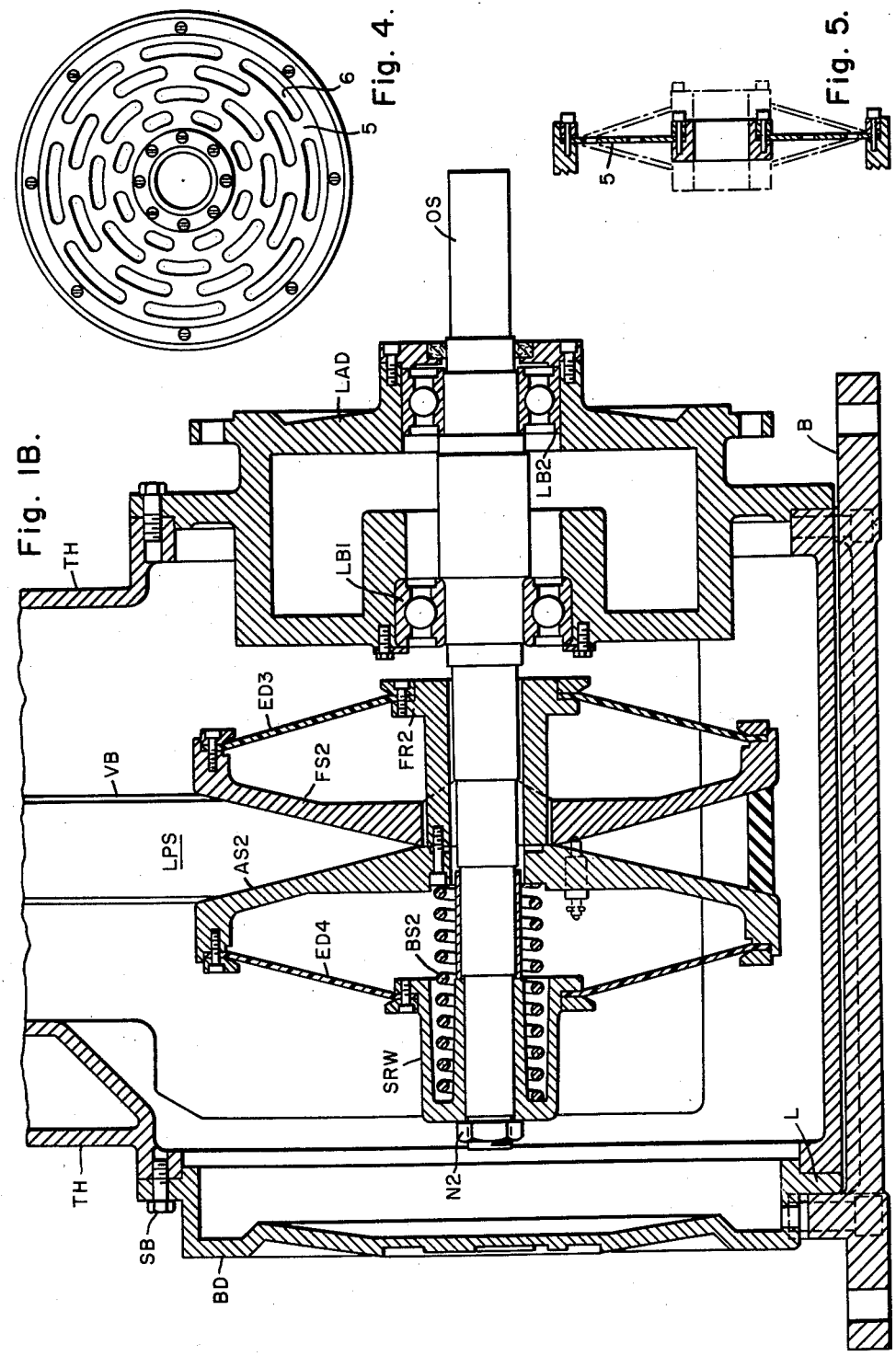

3,085,446
NO-WEAR UNLUBRICATED VARIABLE
V-BELT PULLEY
John W. Erickson, East Aurora, N.Y., assignor to Westinghouse Electric Corporation, East Pittsburgh, Pa., a corporation of Pennsylvania
Filed May 31, 1961, Ser. No. 113,795
12 Claims. (Cl. 74—230.17)

This invention relates to an adjustable ratio transmission mechanism but more particularly to the actuator mechanisms in such a transmission where a wedge-shaped, or V-type, belt cooperates with a pair of pulley structures, each of which has a pair of oppositely directed coned pulley sections for engaging opposite sides of a V-belt. The arrangement is such that the two cooperating pulleys over which one belt is mounted each include one section that is fixed with respect to the shaft upon which it is mounted and the other section is axially adjustable on the shaft toward and away from the first section, whereby the effective pulley diameter is varied.

This invention is particularly concerned with the actuator mechanisms for the axially movable sections of the pulley. In the arrangement one shaft of the transmission mechanism carries a pulley structure wherein spring means bias the sections toward each other to provide a resiliently expansible V-pulley on this one shaft. One section is fixed on the shaft and the spring means act on the section axially movable on the shaft. The other shaft also carries a pulley structure having one section rigidly fixed on the shaft and the other section being axially shiftable on the shaft but provided with positive adjusting means for positively limiting to a minimum the distance between the sections, but also having spring means for biasing the axially movable section toward its minimum distance but for greater distances than the minimum providing a resiliently expansible V-pulley.

With this type of transmission, if the pulley sections are moved apart, the pull on the belt causes the belt to move radially inwardly to a smaller effective pulley diameter on the pulley faces until it is stopped by the wedging action of its sides against the pulley faces. Conversely, if the pulley sections are urged toward each other, the pressure exerted by the coned pulley faces on the inclined sides of the belt produces a force urging the belt radially outward to a greater effective pulley diameter. This function is well known.

In the prior art it is well known to provide on one shaft a pulley structure wherein one section is rigidly secured to the shaft and the other section is axially movable on the shaft with spring means for biasing the other section toward the first, and it is known in the prior art that the other shaft of the transmission carries a pulley structure wherein one section is rigidly secured to the shaft and the other is, through actuating means, axially adjustable on the shaft.

One broad object of this invention is the improvement of the actuating means for the axially adjustable section of a V-pulley.

Another broad object of this invention is to simplify and improve a transmission device using V-belts.

Another broad object of this invention is to simplify the construction of a transmission device using V-pulleys and V-belts that no lubrication need be used with the axially shiftable pulley sections.

A somewhat more specific object of this invention is the provision of actuating means for the axially adjustable section of a V-pulley disposed on the side of the pulley section fixed to the shaft remote from the section axially adjustable on the pulley shaft.

The objects recited are merely illustrative. Other objects and advantages will become more apparent from a study of the following specification when made in conjunction with the accompanying drawings, in which:

FIGURES 1A and 1B together show a longitudinal sectional view of a structure showing this invention;
FIG. 2 shows, in section, some details of the actuator mechanisms for the axially adjustable pulley section;
FIG. 3 is a longitudinal sectional view somewhat schematic, of a modified supporting structure for the elements of a V-pulley;
FIG. 4 is a side view of a modification of a supporting disc for elements of a V-pulley;
FIG. 5 is a longitudinal sectional view of the subject matter shown in FIG. 4; and
FIG. 6 is a transverse sectional view substantially on the line VI—VI of FIG. 1A.

To better understand this invention a detailed description of the invention as shown in FIGS. 1A and 1B may be most helpful.

In FIG. 1, a motor M, mostly broken away, is shown having the motor shaft MS. With respect to the variable ratio transmission mechanisms, presently to be discussed, the motor shaft MS is the driving shaft. Instead of the end-bell the motor housing has, through suitable bolts, as B, an adapter AD, or frame, secured thereto. This adapter carries the entire upper pulley structure UPS and also all the means for axially adjusting the axially adjustable section AS1 with reference to the section FS1 fixed to the shaft.

The adapter is provided with the fixed bearing FB for receiving the motor shaft MS. This bearing may be a sleeve bearing, roller bearing, or ball bearing. As shown it is a ball bearing with the inner race firmly positioned on the shaft MS against a shoulder on the shaft facing to the right, and the outer race firmly positioned in the adapter against a shoulder facing to the left.

The adapter, or frame, AD is provided with a housing H having a cylindrical inner surface coaxially disposed with respect to the motor shaft. This cylindrical inner surface provides a sleeve bearing SB for the sleeve member SM. This sleeve member SM fits snugly into the sleeve bearing SB. The depth of the housing H at the sleeve bearing SB is such that the sleeve member SM may be moved axially in the sleeve bearing SB for its maximum movement from an extreme right-hand position to an extreme left-hand position, about one-fourth to one-third of its own length. The right end of the outer surface of the sleeve member is provided with a pair of spiral cam surfaces CS1 and CS2 facing toward the right and each extending over about 120° of the surface. The pitch of each of these cam surfaces equals substantially the maximum axial movement possible for the sleeve member SM. A pair of stops S1 and S2 are threaded into the housing and at their inner radial ends coact with the cam surfaces CS1 and CS2.

To effect circumferential adjustment of the sleeve member SM in the sleeve bearing SB the rear circumferential surface is provided with the teeth T extending over about 120° of the circumference. See FIG. 2. The teeth engage with a worm wheel WH at the bottom end of the speed ratio adjusting shaft SRAS. The worm teeth on the worm wheel have a very low pitch. This means that the angular position of shaft SRAS firmly fixes the angular position of sleeve member SM in the sleeve bearing SB but the axial movement of the sleeve member is in nowise hampered by the worm wheel WH. It is, however, true that the angular position of sleeve member SM does determine what portions of the cam surfaces CS1 and CS2 are contacting the stops S1 and S2. In short, the sleeve member SM is free to move toward the left but the stops limit the movement toward the right.

The sleeve member SM at its right inner end is provided with a shoulder facing to the left. A biasing spring BS1 is under compression disposed between this shoulder and a suitable spring receiving shoulder at the fixed bearing FB. The sleeve member SM is thus always biased so that the cam surfaces CS1 and CS2 are against the stops S1 and S2.

The inner right end of the sleeve member SM is designed, as shown, to firmly hold the outer race of the ball bearings MB. The inner race is firmly mounted on the outer surface of the sleeve shaft SS. This sleeve shaft SS is provided with a circumferential flange CF against which the inner edge of the elastic disc ED1 is firmly secured. The outer circumference of the elastic disc ED1 is, as shown, firmly secured to the outer left-hand periphery of the pulley section FS1. The pulley section FS1 is at its inner diameter shrunk-fit, or otherwise, firmly secured to the shaft MS. Radially outwardly spaced of the rigid connection of the section FS1 to the shaft, section FS1 is provided with a plurality of axially directed openings, as three. The right end of the sleeve shaft SS is provided with strong projecting prongs P extending through the mentioned openings, as shown in FIG. 6. The right-hand ends of the prongs P are rigidly connected to the hub portion of the adjustable pulley section AS1.

A suitable spacer sleeve SPS is disposed to the right of the rigid connection of the hub of pulley section FS1 and a flange member FM is firmly positioned on the end of the shaft by means of a suitable key and the nut N at the end of the shaft.

By means of a suitable securing ring SR, the inner, or hub, portion of the elastic disc ED2 is fixedly secured to the flange member FM. The outer circumferential portion of elastic disc ED2 is, as shown, rigidly secured to the peripheral right-hand edge of the adjustable pulley section AS1.

The hand wheel HW is rigidly secured to the speed ratio adjusting shaft SRAS. The hand wheel is also, through pinion P1, gear G, pinion P2, operatively coupled to the ring gear RG for driving the index I over the graduated ring GR.

From the foregoing it is apparent that all the operative elements for adjusting the speed ratio are carried by the adapter except that the hub portion of the pulley section FS1 is rigidly carried by the mid-region of the overhanging portion of shaft MS and that the hub portion of elastic disc ED2 is rigidly secured to the right end of the shaft. By manipulating the hand wheel the sleeve member SM is rotated and is thus also moved axially by the cam surfaces. The adjustable pulley section is thus moved by positive action away from the fixed pulley section FS1 but may readily move toward the fixed pulley section FS1 against the bias action of spring BS.

The base B carries the transmission housing TH that is, through suitable means not shown, rigidly secured to the adapter AD. The housing TH is on both sides provided with openings OP provided with sheet metal covers, or side panels, not shown, which may be readily removed for inspection of the pulley structures LPS and thus make it possible by removal to readily replace, or change, the V-belt used on the two pulleys formed respectively by the upper pulley structure UPS and the lower pulley structure LPS.

The lower right-hand side of the transmission housing is provided with a frame, or adapter, LAD carrying two bearings LB1 and LB2. The output shaft OS is mounted for rotation in these bearings. The left end of the shaft OS overhangs the bearings to provide a support for the sections FS2 and AS2. The hub portion of section FS2 is shrunk-fit, or otherwise rigidly secured to the mid-region of the overhanging portion of the shaft OS. Radially spaced from the shrunk-fit on shaft OS the hub of section FS2 is provided with a plurality of axially directed openings, as three.

An elastic disc ED3 is at its outer circular periphery rigidly secured to the section FS2 and at the edge of its inner circular opening rigidly secured to the flanged ring FR2. The ring FR2 is provided with stiff leftwardly axially projecting prongs that pass through the openings in the hub of section FS2 and are at the left ends rigidly secured to the hub of the adjustable section AS2.

A bias spring receiving well SRW is, by a suitable sleeve and the nut N2, rigidly secured to the left end of the shaft OS. A biasing spring BS2 is disposed between the bottom of the well and the hub of section AS2 to bias the sections AS2 and FS2 toward each other. The actual position the sections AS2 and FS2 will hold to each other is thus determined by the position the V-belt is set at in the upper pulley system. The spring BS2 assures the pulley halves AS2 and FS2 will follow the setting selected.

The right-hand end of the spring receiving well SRW is provided with a flange to which the inner circular edge of the elastic disc ED4 is rigidly secured. The outer circular periphery of the disc ED4 is rigidly secured, as shown, to the outer periphery of section AS2.

From the foregoing it is apparent that the lower pulley structure LPS is carried entirely by the adapter LAD, that the shaft OS is overhanging and projects from the adapter LAD in a direction opposite to the direction of the projection of the overhanging portion of shaft MS from the adapter AD, that the shafts are parallel to each other, and that the disposition of the parts is such that the plane of rotation of the pulley formed by the sections FS1 and AS1 falls substantially in the same plane as the plane of rotation of the pulley formed by the sections FS2 and AS2.

The elastic discs shown in FIGS. 1A and 1B represent nylon. Nylon has a relatively long life, is not readily subject to fatigue, and has just the elasticity needed. However, the discs need not be of nylon but may also be made of suitable metal. FIG. 3 shows a pair of metal discs 1 and 2 having concentric convolutions 11 and 12, and 21 and 22 to provide the radial elasticity and axial bending ability needed for axially shifting pulley section 3 with reference to pulley section 4.

FIGS. 4 and 5 show another metal disc 5 that is provided with concentrically arranged staggered openings 6 that give this disc the necessary radial and axial elasticity needed to effect proper relative movement of the pulley sections making up the V-pulley.

Since the elastic discs hold many of the actuator parts free of the shafts it is apparent that no lubrication need be supplied to any of the parts. The whole variable ratio transmission device may thus be operated without lubrication. The only parts that need any lubrication are the bearings FB, MB, LB1 and LB2. These bearings are all pre-lubricated bearings and thus do not require any further lubrication.

While certain relative dimensions have hereinbefore been mentioned and such words as "horizontal," "right," "right-hand," "left," "left-hand," "vertical," etc. have hereinbefore been used, it is to be understood that the transmission device may hold any attitude in space or any position with reference to the direction of the earth's center of gravity with respect to the location of use of the transmission device. The language in this specification and the appended claims is to be interpreted in the light of the statements in this paragraph and not in a limiting sense.

While but one general embodiment has been shown and described modifications may well be made of some of the details all falling well within the scope of this invention.

What is claimed is:

1. In a variable ratio transmission, in combination, a pair of frames, bearing means in each frame having axes that are parallel to each other, shafts in each of said bearing means having an end projecting a selected distance from the bearing means, a pulley structure disposed, substantially at the mid-region of the projecting portions of each shaft, on each shaft, the disposition of the bearings being such that the planes of rotation, of the pulleys formed by the pulley structures, substantially coincide, each of said pulley structures having a pair of pulley sections with opposed conical belt engaging faces, forming, by relative axial adjusting movement of one section with respect to the other section, variable effective pulley diameters, a V-belt operatively connecting the pulleys formed by the sections on each shaft, spring means for biasing the pulley sections on one shaft toward each other, speed ratio controlling means for effecting adjusting movement of one section with respect to the other section of the sections on the other shaft to vary the speed ratio of the transmission, the pulley structure, on the said one shaft having a section whose hub is rigidly secured to the shaft, the other section being concentrically disposed on the shaft and radially spaced therefrom, a flanged ring disposed about said one shaft and radially spaced therefrom between the bearing for the one shaft and the section rigidly secured to the one shaft, an elastic disc connected between the flanged ring and outer periphery of the section rigidly coupled to said one shaft, said flanged ring having projecting prongs extending through the hub of the adjacent section, said prongs being rigidly secured to the other section.

2. In a variable ratio transmission, in combination, a pair of frames, bearing means in each frame having axes that are parallel to each other, shafts in each of said bearings means having ends projecting a selected distance from the bearing means, a pulley structure disposed, substantially at the mid-region of the projecting portions of each shaft, on each shaft, the disposition of the bearings such that the planes of rotation, of the pulleys formed by the pulley structures, substantially coincide, each of said pulley structures having a pair of pulley sections with opposed conical belt engaging faces, forming, by relative axial adjusting movement of one section with respect to the other section, variable effective pulley diameters, a V-belt operatively connecting the pulleys formed by the sections on each shaft, spring means for biasing the pulley sections on one shaft toward each other, speed ratio controlling means for effecting adjusting movement of one section with respect to the other section of the sections on the other shaft to vary the speed ratio of the transmission, the pulley structure on the said one shaft having a section whose hub is rigidly secured to the shaft, the other section being concentrically disposed on the shaft and radially spaced therefrom, a flanged ring disposed about said one shaft and radially spaced therefrom between the bearing for the one shaft and the section rigidly secured to the one shaft, an elastic disc connected between the flange ring and outer periphery of the section rigidly coupled to said one shaft, said flanged ring having projecting prongs extending through the hub of the adjacent section, said prongs being rigidly secured to the other section, a stop member providing a back-up means for the spring means for the pulley structure on said one shaft being secured to the end of said one shaft, and an elastic disc connecting the outer periphery of the movable section and the said stop.

3. In an adjustable ratio transmission, in combination, a frame, a fixed bearing disposed in said frame, a shaft rotatably disposed in said bearing and projecting a selected distance from the frame, a pulley structure having a pair of pulley sections with opposed conical belt engaging faces, forming, by relative axial adjustment of one section with respect to the other section, variable effective pulley diameters, one pulley section being axially shiftably operatively secured to the projecting end of said shaft and radially spaced therefrom, the other pulley section being keyed to the shaft intermediate the end and the fixed bearing in the frame, a sleeve bearing radially spaced a selected distance from the shaft and fixed in a frame to the right of the fixed bearing, a sleeve member having a helical cam surface and being axially shiftable and rotatably movable in said sleeve bearing, stop means on the sleeve bearing, a spring for biasing the sleeve member against the stop means, means for adjusting the rotatable disposition of the sleeve member to present different regions of the helical cam surface to the stop means, a movable bearing, movable with respect to the frame, disposed in the right end of the sleeve member to thus be movable with the sleeve member, a sleeve shaft rotatably mounted in the movable bearing and radially spaced from the rotatable shaft, said shaft having shoulders thereon to be axially movable with the sleeve member, said sleeve shaft having a plurality of projecting prongs, extending through suitable openings in the other pulley section, operatively engaging the first pulley section to shift it with respect to the other pulley section to vary the effective pulley diameter.

4. In an adjustable ratio transmission, in combination, a frame, a first bearing in the frame, a shaft rotatably disposed in said bearing and projecting a selected distance to the right of said bearing, a pulley structure having a pair of pulley sections with opposed conical belt engaging faces, forming by relative axial adjustment of one section with respect to the other variable effective pulley diameters, one pulley section being axially shiftably secured to the right end of the shaft and radially spaced therefrom, the other pulley section being keyed to the projecting end of shaft intermediate the right end and the first bearing, an axially shiftable member provided with a bearing whose axis is coincident with the axis of the first bearing, and is disposed between the first bearing and the other pulley section, a sleeve shaft mounted for rotation in said member and operatively connected for axial movement therewith and radially spaced from the rotatable shaft, said sleeve shaft having a plurality of projecting prongs, extending through the other pulley section, operatively engaging the first pulley section to shift it with respect to the other pulley section to vary the effective pulley diameter, and means for axially adjusting the axial position of said member.

5. In an adjustable ratio transmission, in combination, a frame, a pair of axially spaced bearings in said frame, a shaft rotatably mounted in said bearings, said shaft projecting a selected distance beyond the bearings, a pulley structure having a pair of pulley sections with opposed conical belt engaging faces, forming, by relative axial adjusting movement of one section with respect to the other section, variable effective pulley diameters, one pulley section being axially shiftable on the shaft and radially spaced therefrom but so secured to the projecting end of the shaft to rotate with the shaft and the other section being rigidly secured to the shaft so as not to be shiftable on the shaft but rotatable with the shaft, means radially spaced from the shaft disposed between the frame and the pulley section rigidly secured to the shaft and acting through suitable openings in the last mentioned section for axially shifting the pulley section secured to the projecting end of the shaft to vary the effective pulley diameter.

6. In an adjustable ratio transmission, in combination, a frame, a pair of axially spaced bearings in said frame, a shaft rotatably mounted in said bearings, said shaft projecting a selected distance beyond the bearings, a pulley structure having a pair of pulley sections with opposed conical belt engaging faces, forming, by relative axial adjusting movement of one section with respect to the other section, variable effective pulley diameters, one pulley section being axially shiftable on the shaft and radially spaced therefrom but so secured to the projecting end of the shaft to rotate with the shaft and the other section being rigidly secured to the shaft so as not to be shiftable on the shaft but rotatable with the shaft, means disposed between the frame and the pulley section rigidly secured to the shaft and radially spaced therefrom and acting through suitable openings in the last mentioned section for axially shifting the pulley section secured to the projecting end of the shaft to vary the effective pulley diameter, a second frame, a second shaft, a second pair of axially spaced bearings in the second frame, said bearings in the second frame having an axis that is parallel to the axis of the axis of the two axially spaced bearings in the first frame, said second shaft being rotatably disposed in the second pair of bearings and projecting a selected distance from the second pair of bearings, the second pair of bearings being so disposed that a plane normal to the mid-region of the projecting portion of one shaft is also normal to the mid-region of the projecting portion of the other shaft with the projecting portions of the two shafts with respect to their respective frames being in opposite directions, a second pulley structure having generally similar pulley sections to the pulley sections of the first pulley structure disposed on the projecting end of the second shaft with one section being rigidly secured to the shaft and the other section being axially adjustable on the shaft and radially spaced therefrom to vary the effective pulley diameter.

7. A variable diameter pulley structure including a rotatable shaft and a pair of opposed conical sections forming a pulley, one of said sections having a central hub portion fixed to said shaft for rotation therewith and having circumferentially spaced, axially extending openings spaced radially outwardly from said hub portion, said other section having a central opening disposed concentrically with said rotatable shaft and radially spaced therefrom, a sleeve shaft mounted concentrically about said rotatable shaft for axial movement and radially spaced therefrom, said sleeve shaft including projecting prongs extending through said openings in said one section toward said other section, said sleeve shaft being connected at its end to said other section for movement therewith and elastic means for connecting and supporting said other section on said rotatable shaft.

8. A variable diameter pulley structure including a rotatable shaft and a pair of opposed conical sections forming a pulley, one of said sections having a central hub portion fixed to said shaft for rotation therewith and having circumferentially spaced, axially extending openings spaced radially outwardly from said hub portion, said other section having a central opening disposed concentrically with said rotatable shaft and radially spaced therefrom, a sleeve shaft mounted concentrically on said rotatable shaft for axial movement and radially spaced therefrom, said sleeve shaft including projecting prongs extending through said openings in said one section toward said other section, said sleeve shaft being connected at its end to said other section for movement therewith and an elastic disc having a central opening secured at its outer periphery to the outer periphery of said other section, said disc at its inner periphery operatively secured to said rotatable shaft.

9. A variable diameter pulley structure including a rotatable shaft and a pair of opposed conical sections forming a pulley, one of said sections having a central hub portion fixed to said shaft for rotation therewith and having circumferentially spaced, axially extending openings spaced radially outwardly from said hub portion, said other section having a central opening disposed concentrically with said rotatable shaft and radially spaced therefrom, a sleeve shaft mounted concentrically on said rotatable shaft for axial movement and radially spaced therefrom, said sleeve shaft including projecting prongs extending through said openings in said one section toward said other section, said sleeve shaft being connected at its end to said other section for movement therewith, a first elastic disc having a central opening secured at its outer periphery to the outer periphery of said one section and a second elastic disc having a central opening secured to the outer periphery of said other section, said first elastic disc at its inner periphery secured to said sleeve shaft and said second elastic disc operatively secured at its inner periphery to said rotatable shaft.

10. A variable diameter pulley structure including a rotatable shaft and a pair of opposed conical sections forming a pulley, one of said sections having a central hub portion fixed to said shaft for rotation therewith and having circumferentially spaced, axially extending openings spaced radially outwardly from said hub portion, said other section having a central opening disposed concentrically with said rotatable shaft and radially spaced therefrom, a sleeve shaft mounted concentrically on said rotatable shaft for axial movement and radially spaced therefrom, said sleeve shaft including projecting prongs extending through said openings in said one section toward said other section, said sleeve shaft being connected at its end to said other section for movement therewith and elastic means for connecting and supporting said other section on said rotatable shaft, and means for adjusting said sleeve shaft axially relative to said rotatable shaft.

11. A variable diameter pulley structure including a rotatable shaft and a pair of opposed conical sections forming a pulley, one of said sections having a central hub portion fixed to said shaft for rotation therewith and having circumferentially spaced, axially extending openings spaced radially outwardly from said hub portion, said other section having a central opening disposed concentrically with said rotatable shaft and radially spaced therefrom, a sleeve shaft mounted concentrically on said rotatable shaft for axial movement and radially spaced therefrom, said sleeve shaft including projecting prongs extending through said openings in said one section toward said other section, said sleeve shaft being connected at its end to said other section for movement therewith and an elastic disc having a central opening secured at its outer periphery to the outer periphery of said other section, said disc at its inner periphery operatively secured to said rotatable shaft, and means for adjusting said sleeve shaft axially relative to said rotatable shaft.

12. A variable diameter pulley structure including a rotatable shaft and a pair of opposed conical sections forming a pulley, one of said sections having a central hub portion fixed to said shaft for rotation therewith and having circumferentially spaced, axially extending openings spaced radially outwardly from said hub portion, said other section having a central opening disposed concentrically with said rotatable shaft and radially spaced therefrom, a sleeve shaft mounted concentrically on said rotatable shaft for axial movement and radially spaced therefrom, said sleeve shaft including projecting prongs extending through said openings in said one section toward said other section, said sleeve shaft being connected at its end to said other section for movement therewith, a first elastic disc having a central opening secured at its outer periphery to the outer periphery of said one section and a second elastic disc having a central opening secured to the outer periphery of said other section, said first elastic disc at its inner periphery secured to said sleeve shaft and said second elastic disc operatively secured at its inner periphery to said rotatable shaft, and means for adjusting said sleeve shaft axially relative to said rotatable shaft.

References Cited in the file of this patent

UNITED STATES PATENTS

| | | |
|---|---|---|
| 1,501,705 | Decoux | July 15, 1924 |
| 2,196,606 | Mason et al. | Apr. 9, 1940 |
| 2,202,554 | Heyer et al. | May 28, 1940 |
| 2,289,573 | Almen | July 14, 1942 |

FOREIGN PATENTS

| | | |
|---|---|---|
| 795,712 | Great Britain | May 28, 1958 |